March 6, 1962  N. W. TOZZA  3,023,634

AUTOMOBILE SPEED LIMITING MEANS

Filed March 15, 1960

INVENTOR
NICHOLAS W. TOZZA
BY George Larounis
ATTORNEY

United States Patent Office 3,023,634
Patented Mar. 6, 1962

3,023,634
AUTOMOBILE SPEED LIMITING MEANS
Nicholas W. Tozza, 139 Wood Oak Drive, Westbury, N.Y.
Filed Mar. 15, 1960, Ser. No. 15,086
6 Claims. (Cl. 74—526)

The present invention relates to means for adjustably limiting the speed of an engine equipped with a foot-pedal operated speed control, and more particularly to means for adjustably limiting the speed of an automobile.

The desirability of providing an automobile with some means for adjustably limiting its speed is acknowledged. Even well-intentioned drivers unconsciously exceed established speed limits. Consequently, many devices have been provided for this purpose. None of these devices has met with public approval, however, and automobiles continue to operate without some form of speed limiting control. The inacceptability of these prior art devices appears to stem from a number of factors, the weightiest of these being expense and difficulty of installation.

Accordingly, it is an object of the present invention to provide a speed limiting means for motor-driven vehicles which is relatively quite inexpensive and which may be easily installed without alteration in essentially all automobile types.

In addition to the above factors, an acceptable speed limiting device must be easily adjustable to different speed settings as driving conditions and speed limits vary. Furthermore, the device should be capable of instantly responding without adjustment when unusual situations arise which require speed (or power) beyond that of the then device setting. Such situations include, for example, gaining a hill, passing an automobile, or emergencies.

Accordingly, it is another object of the present invention to provide a speed limiting device which, despite its inexpensiveness and installation simplicity, is readily adjustable and instantly responsive without adjustment to unusual situations.

An apparatus illustrating certain aspects of the invention may comprise a stop interposed in the path of the foot pedal utilized to control engine speed, means for adjusting the position of the stop along such path, and means for locking the stop in a selected position.

A complete understanding of the invention may be obtained from the following detailed description of means forming a specific embodiment thereof, when read in conjunction with the appended drawing, in which.

Figure 1:
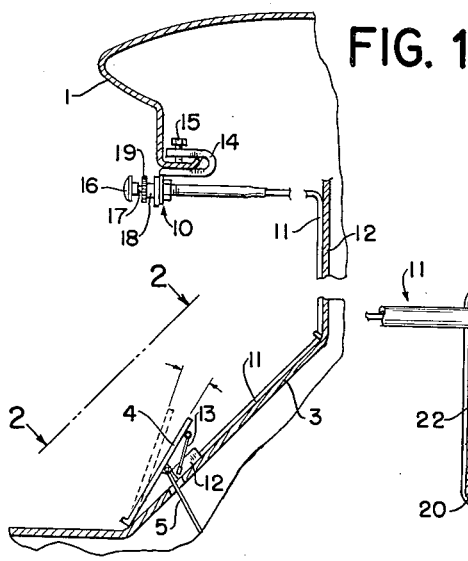
FIG. 1 is a fragmentary side elevation, partly in section, of one form of the present invention mounted in an automobile.

Referring to FIG. 1, a device in accordance with the invention is shown mounted in the driver's compartment of an automobile. The illustrated portions of the compartment include an instrument panel 1, a fire wall 2, a floor board 3 and a foot pedal 4. The foot pedal is connected to the throttle valve of the automobile's engine (not shown) via a connecting rod 5, thereby to control the speed of the automobile. These parts are, of course, conventional in substantially all automobiles.

The device itself includes an adjust and lock housing 10, a flexible connector 11, a gear box 12 and a stop element 13. The adjust and lock housing 10 is attached to the instrument panel 1 by means of a bracket 14 and a mounting screw 15. The gear box 12 is attached to the floor board 3 in the immediate proximity of the foot pedal 4. The flexible connector 11, which leads from the housing 10 to the gear box 12 is advantageously pinned along the fire wall 2 and floor board 3 to be out of the way.

Figure 2:
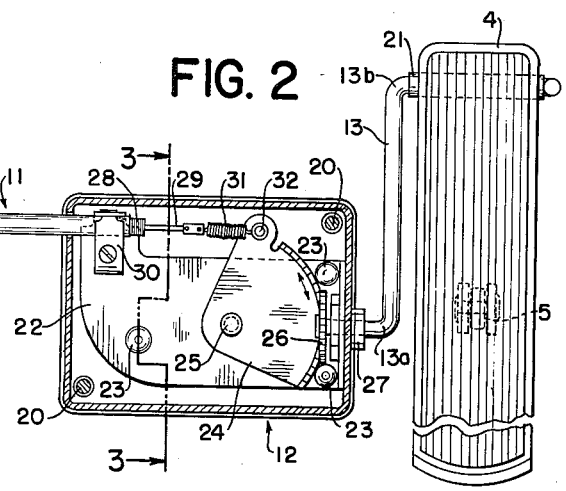
FIG. 2 is a plan view, partly in section, taken along line 2—2 of FIG. 1.
Figure 3:
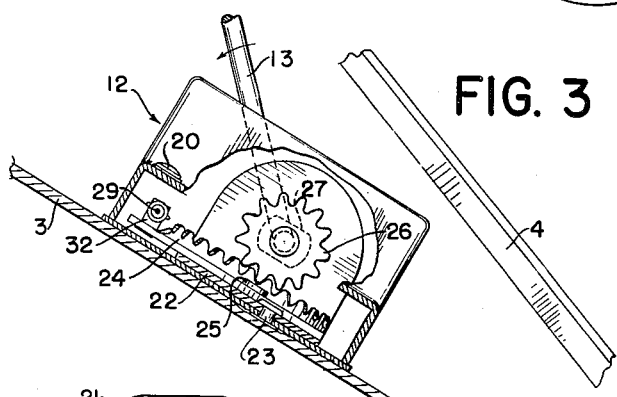
FIG. 3 is a side elevation, partly in section, taken along line 3—3 of FIG. 2.

Referring now to FIGS. 2 and 3, elements therein which are identical to those in FIG. 1 are similarly numbered. Accordingly, the gear box 12 is shown fastened to the floor board 3 by means of two screws 20. The stop element 13 extends from the gear box 12 and is interposed in the path of the foot pedal 4. In this embodiment, the stop element takes the form of a rod having two right angle bends therein which form two extensions 13a and 13b. Extension 13a is inserted into the gear box 12 and extension 13b is interposed in the path of the foot pedal 4. The extension 13b advantageously has a cylindrical roller 21 slipped over it so as to minimize friction between it and the foot pedal for reasons to be described hereinafter.

Inside the gear box 12, a metal plate 22 is fastened to the floor of the box by means of rivets 23. An arcuate quarter gear 24 is pivotally attached to the plate 22 by means of an axle 25. A pinion gear 26 is arranged at right angles to the arcuate gear 24 in meshing relationship so that pivoting of the gear 24 rotates the pinion gear 26 about its axis.

Extension 13a of the stop element 13 is fixedly attached to the pinion gear 26 in axial coincidence therewith. Furthermore, the extension 13a is inserted into the gear box 12 through a bushing 27 so that rotation of the pinion gear 26 also rotates the extension 13a. This rotation is translated into movement of the extension 13b along the travel path of the foot pedal 4.

It will be noted in FIG. 2, that the flexible connector 11 is also inserted into the gear box 12. The connector 11 may be of the conventional type comprising a flexible sheath 28 and a wire 29 which is slidable within the sheath. The sheath 28 is fixedly attached to the plate 22 by means of a clamp 30. The wire 29 is attached through a spring 31 to a point 32 on the arcuate gear 24. The location of the point 32 is selected so that movement of the wire 29 applies a force component to the arcuate gear at right angles to a radial line emanating from the axle 25. Consequently, pushing or pulling of the wire 29 rotates the arcuate gear 24 in a clockwise or counterclockwise direction, respectively.

Movement of the wire 29 is effected by means of the adjust and lock housing 10 shown in FIG. 1. The housing 10 is not shown in detail since it may be any one of a number of conventional adjust and lock units which are available for use with flexible connectors. In the embodiment of FIG. 2, a knob 16 is attached through a rod 17 to the wire 29. The rod 17 is adapted to reciprocate longitudinally within a housing 18. Thus the wire may be either pushed or pulled by either pushing or pulling the knob 16.

Means are also provided for locking the wire 29 in position once it has been moved by the knob to a desired location. In this embodiment, such means comprises a knurled screw 19. This screw, when rotated in one direction, tightens around the rod 17 to lock it in place and, when rotated in the other direction, is loosened so as to permit longitudinal movement of the rod.

The operation of the device of the invention as a speed limiting means for an automobile will now be described with reference to FIGS. 1-3. Let it first be assumed that the driver initially does not wish to have any speed limitation. In that event, he loosens the knurled screw 19 to permit movement of the rod 17. He then pushes the knob 16 which (through the medium of the wire 29 sliding in the sheath 28) rotates the arcuate gear 24 in a clockwise direction around its axle 25. This causes the pinion gear 26 to rotate in a counterclockwise direction thereby to rotate the stop element extension 13b against the floor board 3. Consequently, the stop element is placed out of the way of the foot pedal 4. The screw 19 is then tightened to lock the stop element 13 in place.

Assume, now, that the automobile has entered a superhighway having a preselected speed limit. The driver does not wish to exceed the speed limit but realizes that he may involuntarily do so. With the present invention, he need merely bring the automobile up to the maximum speed desired. He then loosens the knurled screw 19 and pulls on the knob 16 so as to bring the stop element 13 (through the medium of the wire 29 and the gears 24 and 26) up against the bottom of the pedal 4, as shown in FIG. 1. The setting is then completed by tightening the screw 19. It should be noted that this manner of setting the speed limiting device automatically takes into consideration road conditions and the like.

The stop element 13 is now set and locked so as to limit the travel range of the pedal 4. Thus, whenever the driver advances the pedal to the point where contact is made with the stop element 13, he feels a counterforce which tends to prevent him from further advancing the pedal. Consequently, he is faithfully warned whenever the automobile approaches the maximum speed setting previously adopted.

There are times, however, when the driver may wish to momentarily exceed the preset speed without resetting the device. Furthermore, situations exist wherein pedal travel does not give a true indication of speed. For example, if the speed setting is made on a level road, as it would be in the ordinary case, corresponding travel of the pedal 4 when the automobile is progressing up an incline will result in lesser speeds. Accordingly, the invention provides means whereby the driver may knowingly exceed the preset maximum travel position of the pedal 4.

Figure 4:
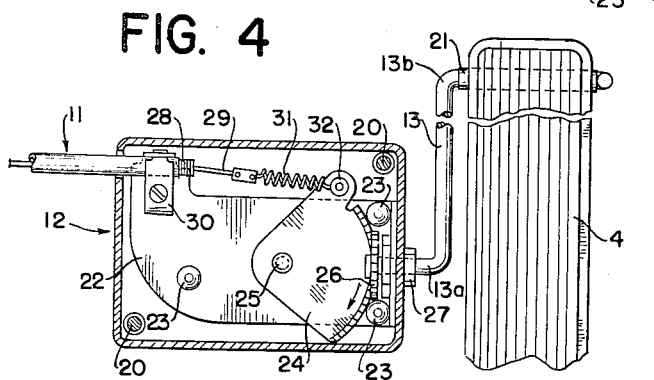
FIG. 4 is a plan view, partly in section, illustrating the responsiveness of the device of FIG. 2 to unusual situations.

The means provided takes the form of the spring 31 (FIGS. 2 and 4) which, as hereinbefore described, links the wire 29 to the arcuate gear 24. This spring is strong enough in tension so that the driver encounters enough resistance to continued advancement of the pedal 4 to recognize that he has arrived at the preselected set position. The driver, however, is capable of overcoming this resistance by a conscious increase of foot pressure on the pedal, thereby to expand the spring 31 as shown in FIG. 4. In this way, the driver may exceed the preset maximum travel position of the pedal 4, but only in a way which insures that he is doing so knowingly.

From the above description, it is seen that the present invention succeeds in achieving its stated objects. The device provided is inexpensive as a result of its simplicity and economy of construction. It may readily be installed in all makes of automobiles since only a few easily accessible points of attachment are required. Moreover, it may be rapidly and accurately adjusted and is instantly responsive to unusual situations.

It is to be understood that the above-described embodiment is simply illustrative of the application of the principles of the invention. Numerous other arrangements may be devised by those skilled in the art which will embody the principles of the invention and fall within the spirit and scope thereof.

What is claimed is:
1. An apparatus for adjustably limiting the speed of an engine equipped with a foot pedal operated speed control, comprising a gear arrangement positioned in the proximity of said foot pedal, said gear arrangement including first and second gears in meshing relationship, the planes of rotation of said gears being disposed substantially at right angles, a stop element mechanically attached to said second gear and interposed in the path of said foot pedal, said stop element and second gear being arranged such that rotation of said second gear moves said stop element along the path of said foot pedal, a flexible connector having one end connected to said first gear at a point removed from its axis of rotation, and a control device connected to the other end of said flexible connector, said control device including means for moving said flexible connector in either longitudinal direction thereby to adjust the position of said stop element along the path of said foot pedal, and means for controllably preventing the longitudinal movement of said flexible connector thereby to lock said stop element in a selected position.

2. An apparatus for adjustably limiting the speed of an engine equipped with a foot pedal operated speed control, comprising a gear arrangement positioned in the proximity of said foot pedal, said gear arrangement including first and second gears in meshing relationship, the planes of rotation of said gears being disposed substantially at right angles, a stop element mechanically attached to said second gear and interposed in the path of said foot pedal, said stop element and second gear being arranged such that rotation of said second gear moves said stop element along the path of said foot pedal, a flexible connector having one end connected to said first gear at a point removed from its axis of rotation, means for moving said flexible connector in either longitudinal direction thereby to adjust the position of said stop element along the path of said foot pedal, and means for locking said stop element in a selected position.

3. An apparatus in accordance with claim 2 wherein the plane of rotation of said second gear is substantially parallel to the plane of the path of said foot pedal and said stop element is arranged to jut out substantially perpendicularly from said second gear into said path.

4. An apparatus in accordance with claim 3 wherein the teeth of said first gear are arranged substantially perpendicularly to its plane of rotation whereas said second gear is a pinion gear.

5. An apparatus in accordance with claim 4 wherein said first gear is in the form of a gear quadrant.

6. An apparatus in accordance with claim 3, which further includes a spring element connected between said flexible connector and said first gear.

References Cited in the file of this patent
UNITED STATES PATENTS

| | | |
|---|---|---|
| 1,992,644 | Watson | Feb. 26, 1935 |
| 2,614,437 | Meggitt | Oct. 21, 1952 |
| 2,689,582 | Coulter | Sept. 21, 1954 |
| 2,776,581 | Hamlin | Jan. 8, 1957 |
| 2,818,747 | Rich | Jan. 7, 1958 |
| 2,861,466 | Brock | Nov. 25, 1958 |
| 2,895,346 | Arch | July 21, 1959 |
| 2,918,155 | Stelzer | Dec. 22, 1959 |